United States Patent [19]
Kim et al.

[11] Patent Number: 6,005,650
[45] Date of Patent: Dec. 21, 1999

[54] LIQUID CRYSTAL DISPLAY

[75] Inventors: Hyang Yul Kim; Seung Hee Lee, both of Ich'on; Jang Sick Park, Seoul, all of Rep. of Korea

[73] Assignee: Hyundai Electronics Industries, Co., Ltd., Kyoungki-do, Rep. of Korea

[21] Appl. No.: 09/107,797

[22] Filed: Jun. 30, 1998

[30] Foreign Application Priority Data

Jun. 30, 1997 [KR] Rep. of Korea ............... 97-30378

[51] Int. Cl.$^6$ ............... G02F 1/1335; G02F 1/1337; G02F 1/1343
[52] U.S. Cl. ............... 349/130; 349/141; 349/117
[58] Field of Search ............... 349/130, 117, 349/118, 120, 143, 141, 123

[56] References Cited

U.S. PATENT DOCUMENTS 5,278,684   1/1994   Mochizuki et al. ............... 349/175

FOREIGN PATENT DOCUMENTS

58-2872   1/1983   Japan .

Primary Examiner—William L. Sikes
Assistant Examiner—Dung Nguyen
Attorney, Agent, or Firm—Townsend and Townsend and Crew LLP

[57] ABSTRACT

A liquid crystal display. The display has a first substrate and a second substrate. One of the substrates is disposed opposite the other a first distance apart. Each of the substrates has an inner surface and an outer surface that is opposite the inner surface. A liquid crystal layer is sandwiched between the inner surfaces of the substrates. At least a pair of a first electrode and a second electrode are arranged along a first direction on the inner surface of the first substrate. The first electrode is disposed parallel to the second electrode a second distance apart. A first homeotropic alignment film is disposed on the first substrate including the first and second electrodes. At least a pair of a third electrode and a fourth electrode are arranged along a second direction on the second substrate. The third electrode is disposed parallel to the fourth electrode a third distance apart, wherein the first direction is perpendicular to the second direction. A second homeotropic alignment film is (disposed on the second substrate including the third and fourth electrodes. A first polarizer is disposed on the outer surface of the first substrate; and a second polarizer is disposed on the outer surface of the second substrate.

24 Claims, 4 Drawing Sheets

LIQUID CRYSTAL DISPLAY

BACKGROUND OF THE INVENTION

The present invention generally relates to a visual display. More particularly, the present invention relates to a liquid crystal display having enhanced viewing angle characteristics which is substantially free from a conventional color shift phenomenon.

In many applications, liquid crystal displays ("LCDs") have replaced cathode ray tubes, which are commonly known as "CRTs," for a variety of reasons. In particular, LCDs are much thinner and generally lighter in weight than conventional CRTs. Other applications using LCDs are desiring a variety of features such as making the panel size larger, enhancing contrast ratio, widening viewing angle, and reducing response time.

A common type of conventional technology used in these displays is called conventional twisted nematic ("TN") display mode. TN mode LCDs have been widely used since they have high definition of black and white colors, and rapid response time. In such a TN mode LCD, pixel electrode and counter electrode are respectively arranged on inner surfaces of two transparent substrates opposite each other. A liquid crystal layer including a plurality of liquid crystal molecules is generally sandwiched between the inner surfaces of the two substrates. The liquid crystal molecules generally maintain a "twisted state" on an absence of a voltage applied to the two electrodes, while they are aligned normal to the surface of the substrates as a voltage higher than a critical voltage is applied. Conventional TN mode LCDs, however, have intrinsic properties of narrow viewing angle and slow response time for gray scale operation.

In order to solve some of these limitations, various techniques have been used or suggested. As merely an example, an in-plane switching ("IPS") mode technique, where pixel and counter electrodes are arranged on the same substrate, has been proposed. The displays with IPS mode have a wider viewing angle to some degree, but still have a narrower viewing angle in a direction normal to the electric field direction that is produced between the pixel and counter electrodes. Moreover, the displays often have color shift caused by a structural property of liquid crystal molecules having longer and short axes. Accordingly, conventional LCDs have numerous limitations.

From the above, it is seen that a technique including a method and device for improving LCDs is highly desired.

SUMMARY OF THE INVENTION

The present invention provides an improved LCD device. More particularly, the present invention provides a method and resulting structure for a liquid crystal display having enhanced viewing angle characteristics which is substantially free from a conventional color shift phenomenon.

According to one aspect of the invention, a liquid crystal display is provided. The display includes a variety of elements such as a first substrate and a second substrate, where one of the substrates is disposed opposite the other a first distance apart. The first distance ranges from about 4 $\mu$m to about 8 $\mu$m, but is not limited. Each substrate has an inner surface and an outer surface. The inner surface is opposite of the outer surface. The display also has a liquid crystal layer sandwiched between the inner surfaces of the substrates. The liquid crystal layer has a plurality of liquid crystal molecules such as nematic liquid crystal molecules and others. A first electrode and a second electrode are arranged along a first direction on the first substrate. The first electrode is disposed parallel to the second electrode a second distance apart. The second distance ranges from about 3 $\mu$m to about 6 $\mu$m, but is not limited. A third electrode and a fourth electrode are arranged along a second direction on the second substrate. The third electrode is disposed parallel to the fourth electrode a third distance apart. The third distance ranges from about 3 $\mu$m to about 6 $\mu$m but is not limited. The first direction is orthogonal to the second direction. A first homeotropic alignment film is disposed on the first substrate including the first and second electrodes, and a second homeotropic alignment film is disposed on the second substrate including the third and fourth electrodes. A first polarizer is disposed on the outer surface of the first substrate, and a second polarizer is disposed on the outer surface of the second substrate.

According to another aspect, a liquid crystal display can further include an optical compensating film in addition to the above described elements, as well as others, of the liquid crystal display according to one aspect of the present invention. The optical compensating film is placed between the first polarizer and the outer surface of the first substrate.

According to a further aspect, a liquid crystal display can further include an optical compensating film in addition to the above described elements of the liquid crystal display according to one aspect of the present invention. The optical compensating film is placed between the first polarizer and the outer surface of the first substrate, and the first distance is greater than the second distance and the third distance.

In a further aspect, the present invention provides a novel method of forming a liquid crystal display. The method includes a variety of steps such as providing a first substrate and a second substrate, where one of the substrates is disposed opposite the other a first distance apart. The first distance ranges from about 4 $\mu$m to about 8 $\mu$m, but is not limited. Each substrate has an inner surface and an outer surface. The inner surface is opposite of the outer surface. The method also includes a step of forming a liquid crystal layer sandwiched between the inner surfaces of the substrates. The liquid crystal layer has a plurality of liquid crystal molecules such as nematic liquid crystal molecules and others. A first electrode and a second electrode are arranged along a first direction on the first substrate. The first electrode is disposed parallel to the second electrode a second distance apart. The second distance ranges from about 3 $\mu$m to about 6 $\mu$m, but is not limited. A step of providing a third electrode and a fourth electrode that are arranged along a second direction on the second substrate also is included. The third electrode is disposed parallel to the fourth electrode a third distance apart. The third distance ranges from about 3 $\mu$m to about 6 $\mu$m but is not limited. The first direction is orthogonal to the second direction. A first homeotropic alignment film is formed on the first substrate including the first and second electrodes, and a second homeotropic alignment film is formed on the second substrate including the third and fourth electrodes. A first polarizer is disposed on the outer surface of the first substrate, and a second polarizer is disposed on the outer surface of the second substrate. In other aspects, the present invention can provide other methods, which do not use all the steps described above, but can also use other steps.

Numerous benefits are achieved by way of the present invention. In some embodiments, the present invention provides for an improved LCD display with a wider viewing angle in all directions without a color shift. In other embodiments, the present invention provides for enhance response time. These and other benefits are in some or all of the embodiments of the present invention. Further details with regard to the present invention are fully described below.

The present invention achieves these benefits in the context of known process technology. However, a further understanding of the nature and advantages of the present invention may be realized by reference to the latter portions of the specification and attached drawings.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE EMBODIMENTS I. Conventional LCD Displays

Figure 1:
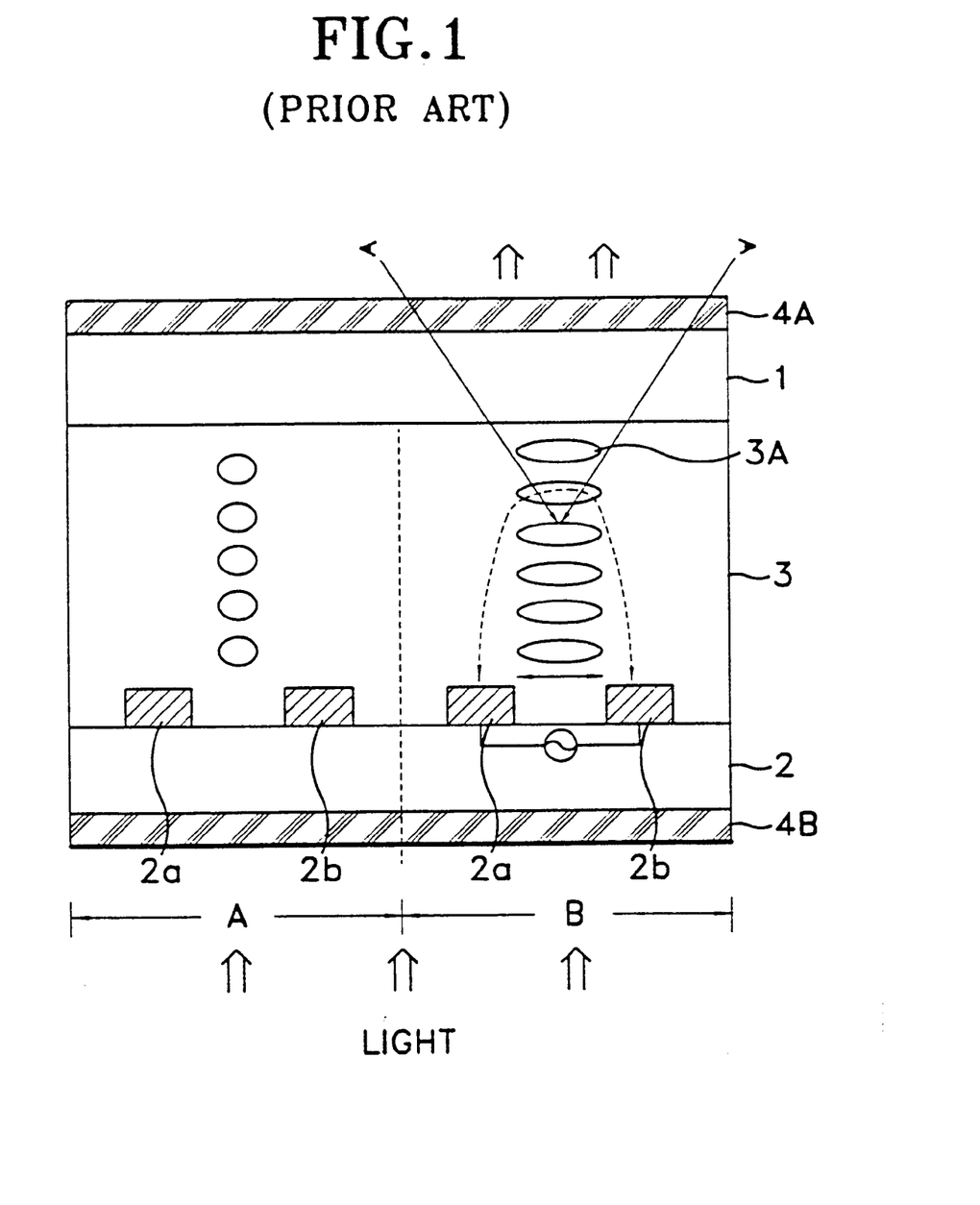
FIG. 1 is a simplified partial sectional view of a conventional liquid crystal display with IPS mode.

FIG. 1 is a simplified cross-sectional view of a conventional liquid crystal display with IPS mode, in which left-handed portion which is divided by dotted lines, shows an arrangement of liquid crystal molecules in an absence of electric field and a right-handed portion shows an arrangement of liquid crystal molecules in the presence of an electric field.

Referring to FIG. 1, a first (or upper) substrate 1 and a second (or lower substrate) 2 each including inner surfaces and outer surfaces are formed with an intervening liquid crystal layer 3 therebetween. The inter-surfaces face each other. A first (or pixel) electrode 2a and a second (or counter) electrode 2b are arranged in parallel alignment to each other. They are also formed at a first distance apart from each other on the inner surface of the lower substrate 2. A first or upper polarizer 4A is arranged on the outer surface of the first substrate 1 and a second or lower polarizer 4B is arranged on the outer surface of the second substrate 2. The first and second polarizers 4A and 4B each generally transmits only light beams oscillating in a specific direction of incident light beams. A first polarizing axis of the first polarizer 4A is orthogonal to a second polarizing axis of the second polarizer 4B. Although not shown in FIG. 1, color filter layers of red ("R"), green ("G"), and blue ("B") are arranged on the inner surface of the upper substrate 1 to provide color displays. In addition, gate bus lines and data bus lines (not shown) with matrix configuration, and switching elements for switching data signals inputted through the data bus lines are provided. First and second homogeneous alignment layers(not shown) are disposed on the inner surfaces of the upper and lower substrates 1 and 2 respectively, including the color filter layers and the electrodes 2a and 2b. The alignment layers determine an initial arrangement state of the liquid crystal molecules. An alignment axis of the second homogeneous alignment layer formed on the lower substrate 2 is the same or similar as the second polarizing axis of the lower polarizer 4B.

In an absence of an electric field, the liquid crystal molecules 3A are arranged such that their longer axes are in parallel alignment with the substrates 1 and 2, and correspond to the alignment direction of the second homogeneous alignment layer as shown in the left-handed portion "A" of FIG. 1. Since the alignment direction of the second homogeneous alignment layer corresponds to the second polarizing axis of the second polarizer 4B, the light which passed the polarizer 4B and then passed the liquid crystal layer 3, does not substantially change the polarized state thereof before incidence into the first polarizer 4A, thereby the screen of the display becomes darker.

Alternatively, in the presence of an electric field, which is produced between the first and second electrodes 2a and 2b, the liquid crystal molecules 3A are arranged such that their longer axes are in parallel alignment with the substrates 1 and 2, and are in parallel alignment with electric field direction which a straight line connecting the two electrodes 2a and 2b direct. Since a longer axis direction of the liquid crystal molecules deviates by 45 degrees from the second polarizing axis of the second polarizer 4B, the light which passed the second polarizer 4B then passed the liquid crystal layer 3 changes the polarized state thereof before incidence into the first polarizer 4A, thereby the screen of the display becomes white or lighter.

Since the liquid crystal molecules have an anisotropic refractive index depending on a user's viewing angle, undesirable color appears on the screen of a white state depending on the user's viewing angle. The reason is described with the following equation (1):

$$T \approx T_0 \sin^2(2_\chi) \cdot \sin^2(\pi \cdot \Delta nd / \lambda) \qquad \text{equation (1)}$$

where

T is a transmittance;

$T_0$ is the transmittance with respect to reference light;

$\chi$ is an angle between the optical axis of the liquid crystal molecules and the polarizing axis of a polarizer;

d is a cell gap or a distance between the first and second substrates or is the thickness of the liquid crystal layer; and $\lambda$ is the wavelength of the incident light.

From the equation (1), when $\Delta nd$ is varied, the wave length of the incident light is accordingly varied to obtain a maximum transmittance. Variation in $\Delta nd$ generally causes color shift in the white state. In further detail, when a user looks at the screen with varying an azimuthal angle, $\Delta n$ comes to be different depending on an azimuthal angle. Therefore, as $\Delta n$ is varied, the wave length is varied. As a result, color shift appears on the screen.

Additionally, the conventional IPS mode LCDs have a wide viewing angle compared with the conventional TN mode LCDs. In such the conventional IPS mode LCDs, however, viewing angle depending on the variation in polar angle along a first direction normal to the electric field direction is often narrower compared with the viewing angle depending on the variation in polar angle along a second direction parallel to the electric field direction.

Moreover, the conventional IPS mode LCDs have other shortcomings. As merely an example, conventional IPS mode LCDs have slow response time since the first and second electrodes 2a and 2b are disposed only on the second substrate 2, thereby liquid crystal molecules close to the first substrate 1 slowly respond to the electric field produced between the first and second electrodes 2a and 2b compared with those close to the second substrate 2. These and other limitation will be described in more detail throughout the present specification and more particularly below.

II. Present LCD Displays

Hereinafter, selected embodiments of the present invention will be explained in detail with reference to the accompanying drawings. These drawings are merely illustrations and should not limit the scope of the claims herein. One of ordinary skill in the art would recognize other variations, modifications, and alternatives.

As shown in the FIGs., the present invention has methods and structures that include benefits or advantages such as improved response time, a wide viewing angle in one or more directions, and limited color shift. Depending upon the embodiment or embodiments, the present invention achieves one or more of these benefits. The present invention includes a device that has a pair of first and second electrodes 11 and 12 that are provided on a first or upper substrate 10 and a pair of third and fourth electrodes 21 and 22 that are also provided on a second or lower substrate 20. Additionally, an optical compensating film 14 is attached to the outer surface of the first substrate 10 to attain a substantially perfect dark state in one or more embodiments, which are described below.

Figure 2A:
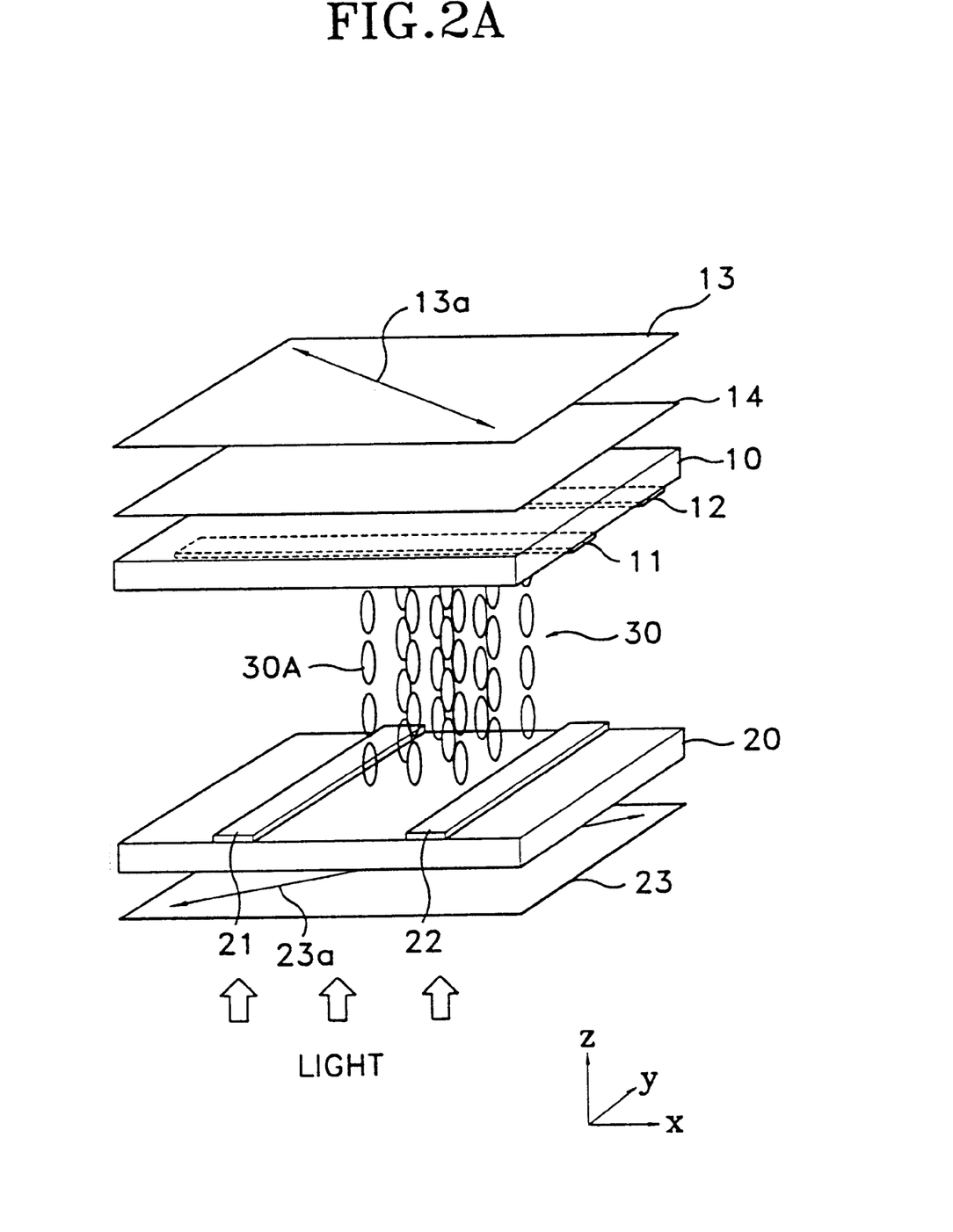
FIGS. 2A and 2B are simplified exploded perspective views of a liquid crystal display according to embodiments of the present invention.
Figure 2B:
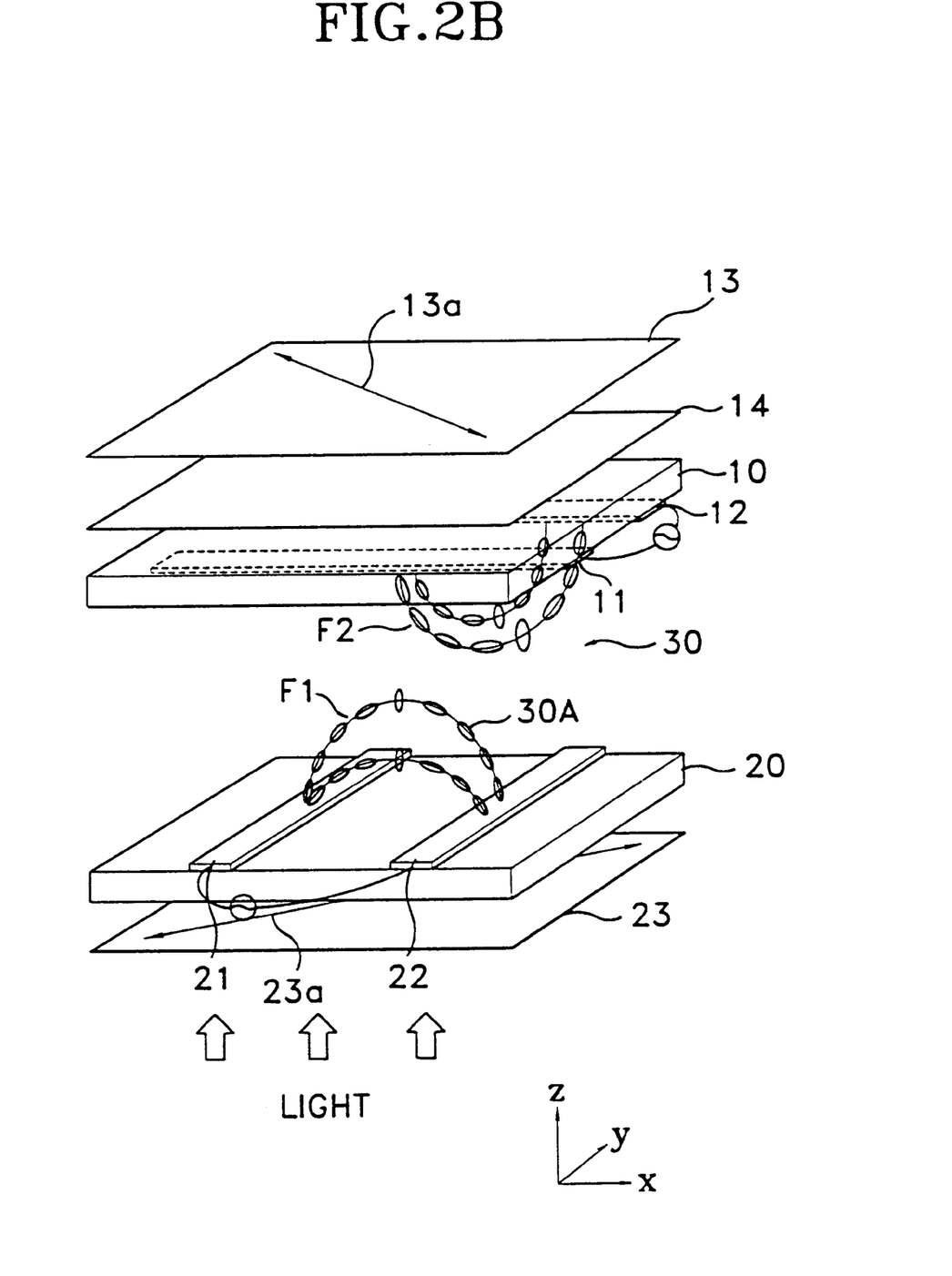

FIG. 2A is a simplified exploded view of a liquid crystal display according to an embodiment of the present invention, in an absence of electric field, and FIG. 2B is a simplified exploded view of a liquid crystal display according to an embodiment of the present invention, in the presence of electric field.

Referring to these FIGs., a first or upper transparent glass substrate 10 and a second or lower transparent glass substrate 20 are provided. The first substrate 10 is disposed opposite the second substrate 20 a first distance apart, which generally ranges from about 4 μm to about 8 μm, but is not limited. Each substrate has an inner surface and an outer surface that is opposite the inner surface. A liquid crystal layer 30 is sandwiched between the inner surfaces of the substrates 10 and 20. The liquid crystal layer 30 has a plurality of liquid crystal molecules 30A. The liquid crystal molecules 30A of the liquid crystal layer 30 have a property of positive dielectric anisotropy. As merely an example, the liquid crystal molecules are derived from nematic liquid crystal, but can be others. Dielectric anisotropy $\Delta\in$ is defined by at least the following equation (2):

$$\text{dielectric anisotropy}(\Delta\in) = \in_p - \in_n \qquad \text{equation (2)}$$

where:

$\in_p$: dielectric constant where the electric field is applied parallel to a direction of an longer axis of the molecule; and $\in_n$: dielectric constant where the electric field is applied normal to a direction of an longer axis of the molecule.

Referring to the above equation, when the dielectric anisotropy is positive, the longer axis of the liquid crystal molecule is arranged parallel to a direction of the electric field. When the dielectric anisotropy is negative, the shorter axis of the liquid crystal molecule is arranged parallel to the direction of the electric field.

A pair of electrodes such as a first electrode 11 and a second electrode 12 for producing an electric field between them are arranged along a first or x-axis direction on the first substrate 10. The first electrode 11 is disposed parallel to the second electrode 12 and is a second distance apart. A pair of electrodes such as a third electrode 21 and a fourth electrode 22 for producing an electric field between them are arranged along a second or y-axis direction on the second substrate 20. The third electrode 21 is disposed parallel to the fourth electrode 22 and is a third distance apart. The first and second electrodes 11 and 12 that are arranged along the first direction are orthogonal to the third and fourth electrodes 21 and 22 arranged along the second direction. This provides liquid crystal molecules 30A that have isotropic characteristics in substantially all directions. Here, the first and third electrodes 11 and 21 function as the pixel electrode in general LCDs and the second and fourth electrodes 12 and 22 function as the counter electrode. Exemplary electrode materials include indium tin oxide, tin oxide, and antimony doped tin oxide. In the present invention, tin oxide is used as the first to fourth electrodes 11, 12, 21, and 22. The electrodes 11, 12, 21, and 22 are relatively thin and are adequately transparent so that they preferably do not significantly affect the optics of the liquid crystal display. The second and third distances may be almost the same or a little different from each other, but each of the second and third distances should be smaller than the first distance or cell gap between the first and second subtrates 10 and 20.

A first homeotropic aligmnent film (not shown) is disposed on the first substrate 10 including the first and second electrodes 11 and 21, and a second homeotropic alignment film(not shown) is also disposed on the second substrate 20 including the third and fourth electrodes 21 and 22. The word "homeotropic" is generally meant, but is not limited to, that the liquid crystal molecules 30A are arranged normal to the substrate in an absence of electric field. The homeotropic films allow the liquid crystal molecules 30A have an angle of about 85 degrees to about 90 degrees, preferably about 90 degrees with respect to the substrate. As merely an example, a homeotropic film is polyimide JALS-204 manufactured by Japan Synthetic Rubber Co, and can be others. On the outer surface of the first substrate 10 is disposed a first polarizer 13, and on the outer surface of the second substrate 20 is disposed a second polarizer 23. The first and second polarizers 13 and 23 have first and second polarizing axes to transmit only light oscillating in a specific direction, for example, which is shown by arrows 13a, 23a in FIGS. 2A and 2B. The first polarizing axis is orthogonal to the second polarizing axis. The first polarizing axis deviates by an angle, preferably by 45 degrees from a first electric field direction produced between the first and second electrodes 11 and 12 in the counterclockwise direction. The second polarizing axis also deviates by an angle, preferably by 45 degrees from a second electric field direction produced between the third and fourth electrodes 21 and 22 in the counterclockwise direction.

Figure 3A:
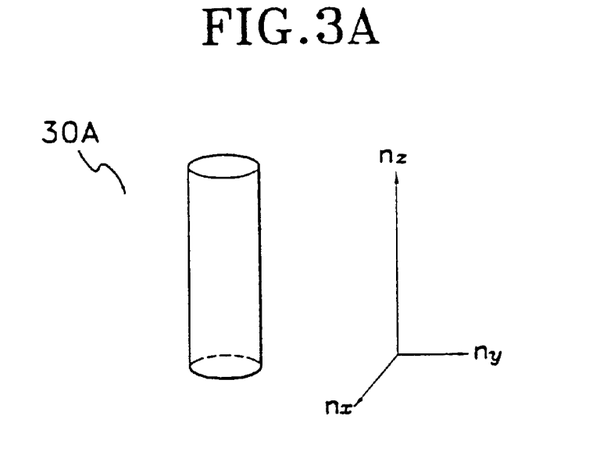
FIG. 3A is a simplified enlarged view of one liquid crystal molecule of FIGS. 2A and 2B.
Figure 3B:
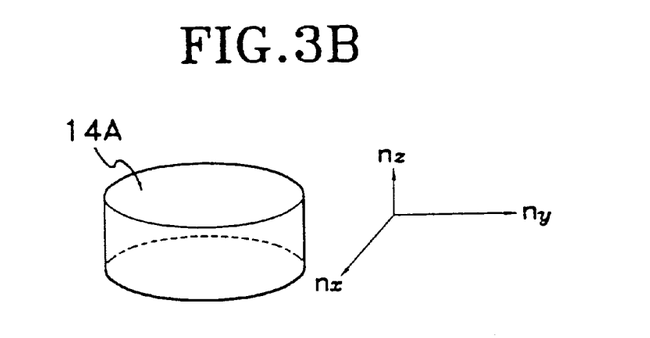
FIG. 3B is a simplified enlarged view of one liquid crystal molecule of the optical compensating film of FIGS. 2A and 2B.

Generally, as shown in FIG. 3, the liquid crystal molecules 30A are rod shape having positive birefringence where the height ($n_z$) of each molecule is larger than the radius ($n_x=n_y$) thereof. Since the liquid crystal molecule 30A has a longer axis and a shorter axis, it exhibits an anisotropic refractive index characteristic. As a result, a light leakage occurs depending on a variation in user's or viewer's polar angle. Such a light leakage deteriorates the contrast of the liquid crystal display. Therefore, to improve the contrast and thereby to widen viewing angle, an optical compensating film 14 can be inserted or additively used, and is disposed between the outer surface of the first substrate 10 and the first polarizer 13. The optical compensating film 14 is a often a cured liquid crystal film including a plurality of molecules 14A having a negative birefringence, as shown in FIG. 3B. Each molecule 14A ($n_x=n_y>n_z$) has the radius $n_x$ or $n_y$ thereof longer than the height $n_z$ thereof. Each molecule 14A has a "disk type" structure or a bi-directionally stretched structure.

Therefore, the optical compensating film 14 compensates for the anisotropic refractive index of the LCD panel and thereby the LCD panel can exhibit an apparent isotropic characteristics.

Light incident into the optical compensating film 14 generates phase delay after passing the optical compensating film 14. Phase delay is defined as a product of thickness of the phase compensating film 14 and the anisotropic refractive index of cured liquid crystal molecule 14A, and is also referred to as "retardation". In case that retardation of the optical compensating film 14 is given to 460 nm, a product of cell gap d (equal to thickness of the liquid crystal layer 30) and the anisotropic refractive index Δn of the liquid crystal molecules 30A should be 460 nm so as to make the liquid crystal molecules 30A have almost perfect isotropic characteristic. For example, when cell gap d is given to 4.8 μm and the retardation is given to 460 nm, the liquid crystal molecules have an anisotropic refractive index of 0.095.

Next, operation of the liquid crystal display with the above structure will be explained below.

First, when an electric field is not applied to the liquid crystal layer 30, the liquid crystal molecules 30A are arranged normal to the substrates 10 and 20 due to the Vander Waals force between the first and second homeotropic alignment layers (not shown) and the liquid crystal molecules, as shown in FIG. 2A. At this time, the light which passed the second polarizer 23 and then passed the liquid crystal layer 30, is obstructed by the first polarizer 13. Linearly polarized light which passed the second polarizer 23 and then passed the liquid crystal layer 30, does not change the polarized state thereof because generally all of the liquid crystal molecules 30 are arranged such that their longer axes are normal to the substrates 10 and 20. Therefore, the screen of the display becomes darker.

Incident light into the liquid crystal layer 30 can be divided into two groups. The first group is incident light beams that are parallel to the longer axis of the liquid crystal molecule 30A. The second group is incident light beams that have a selected angle with respect to the longer axis of the liquid crystal molecule 30A. In the present embodiment, regardless of incident angle of incident light beams, incident light beams appear to be completely obstructed by the polarizer 14 due to the existence of the optical compensating film 14. In further detail, the optical compensating film 14 tends to make the rod shaped liquid crystal molecule serve as disk shaped liquid crystal molecuels. Thus, full darkness is attained in almost all directions.

Alternatively, when an electric field is applied to the liquid crystal layer, i.e., when a voltage V>Vth is applied to the first to fourth electrodes 11, 12, 21, and 22, there are formed at least two kinds of electric fields. One field is formed between the first and second electrodes 11 and 12, and the other field is formed between the third and fourth electrodes 21 and 22. The two electric field are both horizontal electric fields having electric force lines of parabolic form. The electric field F2 produced between the first and second electrodes 11 and 12 is generally perpendicular to the electric field F1 produced between the third and fourth electrodes 21 and 22. Therefore, the portions of liquid crystal molecules close to the first substrate 10 are aligned parallel to the electric field F2 and liquid crystal molecules close to the second substrate 20 are aligned parallel to the electric field F1, whereby the liquid crystal molecules 30A in the liquid crystal layer 30 are twisted by about 90 degrees. Accordingly, when the viewer looks at the screen, the liquid crystal molecules seem to be arranged in a symmetrical configuration. During formation of the electric fields F1 and F2, liquid crystal molecules close to the first substrate 10 are arranged along the electric field F2. At this time, liquid crystal molecules existing in a mid-way or center portion between the first and second electrodes 11 and 12 still maintain off-state configuration since they are substantially free from any influence by the field F2. A first disclination line 16 is formed.

Figure 4:
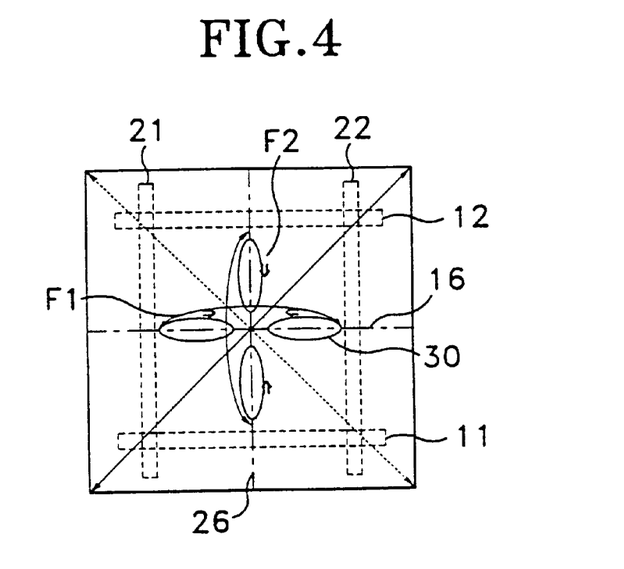
FIG. 4 is a simplified plan view of a liquid crystal display according to embodiments of the present invention.

Alternatively, liquid crystal molecules close to the second substrate 20 are arranged along the electric field F1. In particular, liquid crystal molecules existing in a mid-way or center portion between the third and fourth electrodes 21 and 22 maintain an off-state configuration since they are not generally influenced by the field F1. Accordingly, a second disclination line 26 is formed. From the first and second disclination lines 16 and 26, as shown in FIG. 4, at least four domains of symmetrical configuration are formed at a region defined by the first to the fourth electrodes 11, 12, 21, and 22, without a special rubbing process. Here, the liquid crystal molecules 30A show isotropic characteristics in all spatial (i.e., x, y, and z) directions. Therefore, color shift is not generated, where conventional IPS mode LCDs are often plagued with such color shift limitations.

Meanwhile, if the cell gap or the first distance is smaller than the second distance and the third distance, vertical electric field may be produced between the first electrode 11 and the third electrode 21, and/or vertical electric field may be produced between the second electrode 12 and the fourth electrode 22. Even in the presence of electric field, the liquid crystal molecules do not substantially change their arrangement state. Accordingly, as previously above, the cell gap should be greater than the first distance between the first and second electrodes 11 and 12 and the second distance between the third and fourth electrodes 21 and 22. As a merely example, if the first distance and the second distance are both 4.0 μm, the cell gap is 4.2 μm or more.

Although the present invention describes and shows that the electrodes are all straight line shape, various other modifications can be readily made by those skilled in the art, only if a first electric field produced by a pair of electrodes formed on the first substrate and a second electric field produced by a pair of electrodes formed on the second substrate are perpendicular to each other and are parallel to the substrates.

As described above, according to this invention, in the presence of the electric field, a parabolic electric field is produced and the liquid crystal molecuels are thereby arranged symmetrically relative to a point in a central area or region midway between the electrodes. As a result, since the liquid crystal layer is divided into four domains, a wide viewing angle with symmetry can be obtained.

Moreover, in the absence of the electric field, the light leakage is prevented by the optical compensating film and thus the screen becomes perfectly dark. Therefore, the contrast ratio is greatly improved.

Furthermore, the liquid crystal molecules in the conventional IPS mode LCDs are aligned only by one electric field component produced between two electrodes formed only on one substrate in this embodiment of this invention, but the liquid crystal molecules in the present IPS mode LCDs are aligned by two electric field components produced between four electrodes formed respectively on two substrates. Therefore, the response time of the liquid crystal display according to the present invention is greatly improved.

Additionally, since four domain structure is formed within a region bounded by a pair of electrodes formed on the first substrate and a pair of electrodes formed on the second substrate, almost the same number of the longer axes and the shorter axes of the liquid crystal molecules are seen in the presence of the electric field. Therefore, color shift which occurs in the conventional IPS mode LCDs can be obviated.

Various other modifications will be apparent to and can be made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display comprising:
    a first substrate and a second substrate, said first substrate being disposed opposite said second substrate and being disposed a first distance apart, each of said substrate having an inner surface and an outer surface, wherein said inner surfaces are opposite each other;
    a liquid crystal layer sandwiched between the inner surfaces of the substrates, said liquid crystal layer comprising a plurality of liquid crystal molecules;
    a first electrode and a second electrode arranged along a first direction on said inner surface of said first substrate, the first electrode being disposed parallel to the second electrode a second distance apart. said first and said second electrodes adapted to generate a first electric field therebetween;
    a first homeotropic alignment film disposed on the first substrate including the first and the second electrodes;
    a third electrode and a fourth electrode arranged along a second direction on the inner surface of said second substrate, the third electrode being disposed parallel to the fourth electrode a third distance apart, said third and said fourth electrode adapted to generate a second electric field therebetween, wherein the first direction is perpendicular to the second direction;
    a second homeotropic alignment film disposed on the second substrate including the third and fourth electrodes;
    a first polarizer disposed on the outer surface of the first substrate; and
    a second polarizer disposed on the outer surface of the second substrate.

2. The liquid crystal display in claim 1, wherein said liquid crystal molecules have a positive dielectric anisotropy.

3. The liquid crystal display in claim 1, wherein the first polarizer has a first polarizing axis and the second polarizer has a second polarizing axis, said first polarizing axis is perpendicular to the second polarizing axis.

4. The liquid crystal display in claim 3, wherein said first polarizing axis deviates by approximate 45 degrees from a first electric field direction produced between said first and second electrodes in the counterclockwise direction.

5. The liquid crystal display in claim 3, wherein said second polarizing axis deviates by approximate 45 degrees from a second electric field direction produced between said third and fourth electrodes in the counterclockwise direction.

6. The liquid crystal display as in claim 1, wherein said first distance is at least about 105 percent as long as said second distance.

7. The liquid crystal display as in claim 1, wherein said first distance is at least about 105 percent as long as said third distance.

8. A liquid crystal display comprising:
    a first substrate and a second substrate, said first substrate being disposed opposite said second substrate and being disposed a first distance apart, each of said substrate having an inner surface and an outer surface, wherein said inner surfaces are opposite each other;
    a liquid crystal layer sandwiched between the inner surfaces of the substrates, said liquid crystal layer comprising a plurality of liquid crystal molecules;
    at least a pair of a first electrode and a second electrode arranged along a first direction on said inner surface of said first substrate, the first electrode being disposed parallel to the second electrode a second distance apart, said first and said second electrodes adapted to generate a first electric field therebetween;
    a first homeotropic alignment film disposed on the first substrate including the first and second electrodes;
    at least a pair of a third electrode and a fourth electrode arranged along a second direction on the second substrate, the third electrode being disposed parallel to the fourth electrode a third distance apart, said third and said fourth electrode adapted to generate a second electric field therebetween, wherein the first direction is perpendicular to the second direction;
    a second homeotropic alignment film disposed on the second substrate including the third and fourth electrodes;
    a first polarizer disposed on the outer surface of the first substrate;
    a second polarizer disposed on the outer surface of the second substrate; and
    an optical compensating film disposed between said first polarizer and the outer surface of said first substrate.

9. The liquid crystal display in claim 8, wherein the optical compensating film is made of a liquid crystal film including a plurality of molecules of negative birefringent index.

10. The liquid crystal display in claim 8, wherein said liquid crystal molecules have a property of positive dielectric anisotropy.

11. The liquid crystal display in claim 8, wherein said optical compensating film has a bi-directionally stretched structure.

12. A liquid crystal display comprising:
    a first substrate and a second substrate, said first substrate being disposed opposite said second substrate and being disposed a first distance apart, each of said substrate having an inner surface and an outer surface that is opposite the inner surface;
    a liquid crystal layer sandwiched between the inner surfaces of the substrates, said liquid crystal layer comprising a plurality of liquid crystal molecules;
    at least a pair of a first electrode and a second electrode arranged along a first direction on said inner surface of said first substrate, the first electrode being disposed parallel to the second electrode a second distance apart;
    a first homeotropic alignment film disposed on the first substrate including the first and second electrodes;
    at least a pair of a third electrode and a fourth electrode arranged along a second direction on the second substrate, the third electrode being disposed parallel to the fourth electrode a third distance apart, wherein the first direction is perpendicular to the second direction;
    a second homeotropic alignment film disposed on the second substrate including the third and fourth electrodes;
    a first polarizer disposed on the outer surface of the first substrate;

a second polarizer disposed on the outer surface of the second substrate; and an optical compensating film disposed between said first polarizer and the outer surface of said first substrate;

wherein said optical compensating film comprises a plurality of cured liquid crystal molecules with disk structure, each molecule having radius greater than height thereof.

13. The liquid crystal display in claim 12, wherein said optical compensating film has a retardation, said retardation is equal to a product of anisotropic refractive index of said liquid crystal molecules and said first distance.

14. A liquid crystal display comprising:

a first substrate and a second substrate, said first substrate being disposed opposite said second substrate and being disposed a first distance apart, each of said substrates having an inner surface and an outer surface, wherein said inner surfaces are opposite each other; P1 a liquid crystal layer sandwiched between the inner surfaces of the substrates, said liquid crystal layer comprising a plurality of liquid crystal molecules;

at least a pair of a first electrode and a second electrode arranged along a first direction on said inner surface of said first substrate, the first electrode being disposed parallel to the second electrode a second distance apart, said first and said second electrodes adapted to generate a first electric field therebetween;

a first homeotropic alignment film disposed on the first substrate including the first and second electrodes;

at least a pair of a third electrode and a fourth electrode arranged along a second direction on the second substrate, the third electrode being disposed parallel to the fourth electrode a third distance apart, said third and said fourth electrode adapted to generate a second electric field therebetween, wherein the first direction is perpendicular to the second direction;

a second homeotropic alignment film disposed on the second substrate including the third and fourth electrodes;

a first polarizer disposed on the outer surface of the first substrate;

a second polarizer disposed on the outer surface of the second substrate; and an optical compensating film disposed between said first polarizer and the outer surface of said first substrate, wherein said first distance is greater than the second distance and the third distance.

15. The liquid crystal display in claim 14, wherein the optical compensating film is made of a liquid crystal film including a plurality of molecules of negative birefringent index.

16. The liquid crystal display in claim 14, wherein liquid crystal molecules have a property of positive dielectric anisotropy.

17. The liquid crystal display in claim 14, wherein said optical compensating film has a bi-directionally stretched structure.

18. A liquid crystal display comprising:

a first substrate and a second substrate, said first substrate being disposed opposite said second substrate and being disposed a first distance apart, each of said substrates having an inner surface and an outer surface that is opposite the inner surface;

a liquid crystal layer sandwiched between the inner surfaces of the substrates, said liquid crystal layer comprising a plurality of liquid crystal molecules;

at least a pair of a first electrode and a second electrode arranged along a first direction on said inner surface of said first substrate, the first electrode being disposed parallel to the second electrode a second distance apart;

a first homeotropic alignment film disposed on the first substrate including the first and second electrodes;

at least a pair of a third electrode and a fourth electrode arranged along a second direction on the second substrate, the third electrode being disposed parallel to the fourth electrode a third distance apart, wherein the first direction is perpendicular to the second direction;

a second homeotropic alignment film disposed on the second substrate including the third and fourth electrodes;

a first polarizer disposed on the outer surface of the first substrate;

a second polarizer disposed on the outer surface of the second substrate; and an optical compensating film disposed between said first polarizer and the outer surface of said first substrate, wherein said first distance is greater than the second distance and the third distance;

wherein said optical compensating film comprises a plurality of cured liquid crystal molecules with disk structure, each molecule having radius greater than height thereof.

19. The liquid crystal display in claim 18, wherein said optical compensating film has a retardation, said retardation is equal to a product of anisotropic refractive index of said liquid crystal molecules and said first distance.

20. A method for forming a liquid crystal display, said method comprising:

providing a first substrate and a second substrate, said first substrate being disposed opposite said second substrate and being disposed a first distance apart, each of said substrate having an inner surface and an outer surface, wherein said inner surfaces are opposite each other;

forming a liquid crystal layer sandwiched between the inner surfaces of the substrates, said liquid crystal layer comprising a plurality of liquid crystal molecules;

forming a first electrode and a second electrode arranged along a first direction on said inner surface of said first substrate, the first electrode being disposed parallel to the second electrode a second distance apart, said first and said second electrodes adapted to generate a first electric field therebetween;

forming a first homeotropic alignment film on the first substrate including the first and second electrodes;

forming a third electrode and a fourth electrode arranged along a second direction on the second substrate, the third electrode being disposed parallel to the fourth electrode a third distance apart, said third and said fourth electrode adapted to generate a second electric field therebetween, wherein the first direction is perpendicular to the second direction;

forming a second homeotropic alignment film disposed on the second substrate including the third and fourth electrodes;

forming a first polarizer disposed on the outer surface of the first substrate; and forming a second polarizer disposed on the outer surface of the second substrate.

21. The method of claim 20, wherein said liquid crystal molecules have a positive dielectric anisotropy.

22. The method of claim 20, wherein the first polarizer has a first polarizing axis and the second polarizer has a second polarizing axis, said first polarizing axis is perpendicular to the second polarizing axis.

23. The method of claim 22, wherein said first polarizing axis deviates by approximate 45 degrees from a first electric field direction produced between said first and second electrodes in the counterclockwise direction.

24. The method of claim 22, wherein said second polarizing axis deviates by approximate 45 degrees from a second electric field direction produced between said third and fourth electrodes in the counterclockwise direction.

* * * * *